Aug. 4, 1925.  
J. L. NIX  
EGG TRAY  
Filed Jan. 28, 1924

1,548,478

INVENTOR JAMES L. NIX,
by James L. Hopkins, ATTORNEY.

Patented Aug. 4, 1925.

1,548,478

UNITED STATES PATENT OFFICE.

JAMES L. NIX, OF HOMER CITY, PENNSYLVANIA.

EGG TRAY.

Application filed January 28, 1924. Serial No. 688,988.

*To all whom it may concern:*

Be it known that I, JAMES L. NIX, a citizen of the United States of America, residing at Homer City, in the county of Indiana and State of Pennsylvania, have invented certain new and useful Improvements in Egg Trays, of which the following is a specification, reference being had therein to the accompanying drawings.

My invention relates to an improved egg tray for use in incubation and has for its object to provide a tray having turning means, which turning means are disconnected by the operation of withdrawing the tray from the incubator; the tray also having egg compartments provided with perforate bottoms, enabling the eggs to be tested without removal from the tray.

The tray of my invention provides for holding the eggs on end with the result of increasing the egg carrying capacity of the tray; while the eggs lie in the proper position, approximately the horizontal for incubating being successively carried with their opposite sides uppermost.

Other advantages incident to my invention will be apparent from the following description.

Drawings.

Description.

Figure 1:
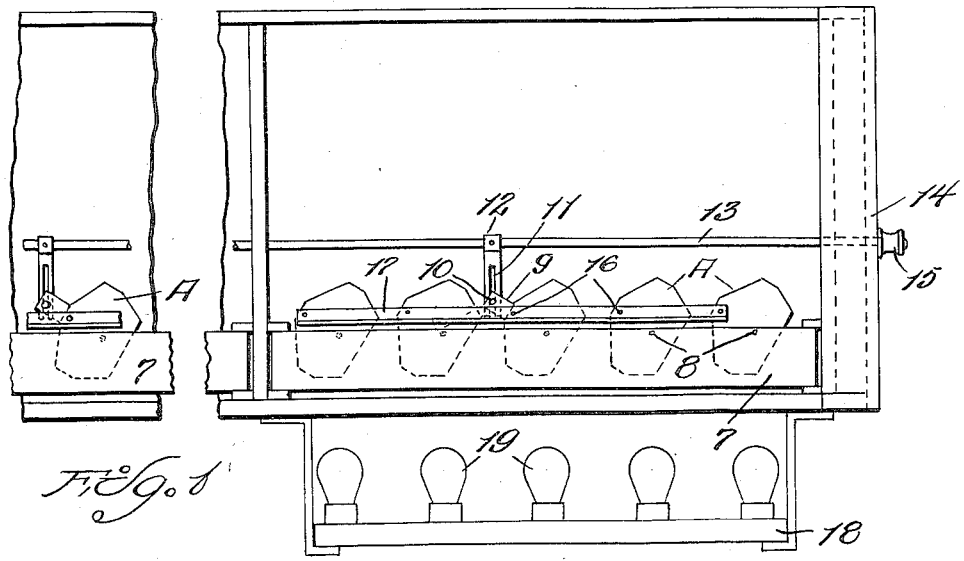
Fig. 1 is a transverse vertical view of an apparatus embodying my invention.
Figures 2, 3:
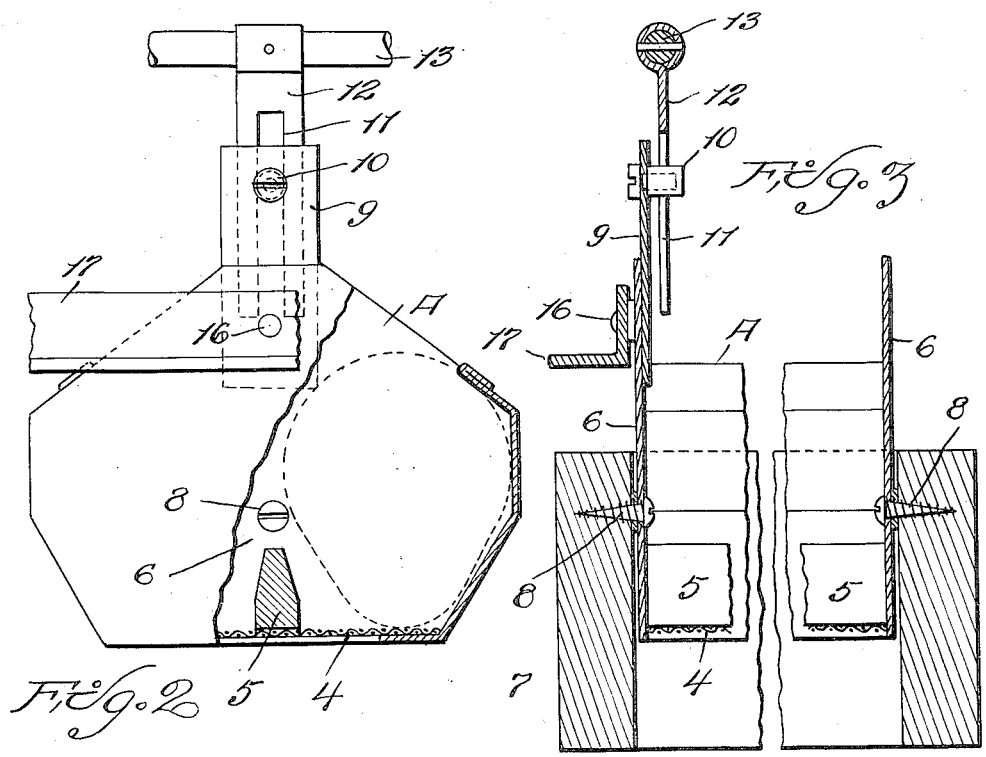
Fig. 2 is an enlarged detailed end view of the center receptacle of each egg tray.
Fig. 3 is a detailed view illustrating the contact between the center receptacle shown in Fig. 2 and the operating rod by which the egg receptacles are turned.

As shown in the drawing I provide a series of elongated cradles A, having bulging parallel sides of the form illustrated in Figs. 1 and 2, wherein the eggs are deposited in pairs in vertical position as shown in Fig. 2. The cradle has a perforate bottom 4 and a longitudinal separating strip 5 mounted along the length of said bottom. The end plate 6 is pivoted in place within the drawer 7 as indicated by 8. I prefer to use an odd number of said cradles A in each of the drawers 7, the center cradle in each drawer (illustrated in Fig. 2) having a vertical arm 9 provided with an inwardly projecting prong 10 extending into and riding in the slot 11 of the arm 12. The bar 12 is fixed upon the transverse rod 13 which extends through the wall 14 of the incubator and terminates in a knob 15. In each of the drawers 7 the cradles A are connected to each other by pintles 16 extending into the connecting bar 17. A transverse rack 18 carries electric lamps 19, one lamp for each of the cradles A. Bottoms 4 of said cradles A being perforate, the eggs may be tested as to fertility and life by pulling the drawer 7 outwardly so that each of the eggs may be viewed downwardly against the light of the lamps 19 without removal of the egg from the cradle A wherein it rests.

Mode of operation.

The drawer 7 may be withdrawn at pleasure for the purpose of examining its contents, its initial outward movement drawing the prong 10 out of contact with the slot 11, the rod 13 and its attached bar 12 remaining in place.

The position in which the eggs are held within the cradles A, as above described, is the ideal position for incubating (see Fig. 1) and the turning is effected by a single pull or thrust upon the knob 15 to the limit of its movement in the desired direction.

I have illustrated and described the preferred embodment of my invention, and the drawing and description are not intended to be construed as limiting my invention but merely as illustrative thereof. Structural changes can be made without departure from my invention as defined in the following claims.

I claim—

1. An egg tray composed of cradles each having bulging parallel sides contoured and spaced to receive eggs in pairs and standing on end; a perforate bottom; a longitudinal parting strip mounted in contact with said bottom; and ends supporting the cradles and pivotally mounted at a point in alinement with the center of gravity of the cradle; in combination with a reciprocating mechanism for said cradles having sliding engagement with one of said cradles and arranged to be disconnected therefrom by the withdrawal of said tray from its seat.

2. An egg tray composed of cradles having bulging parallel sides contoured and spaced to receive eggs in pairs and standing on end; a perforate bottom; a longitudinal parting strip mounted in contact with said bottom; and ends supporting the cradles and pivotally mounted at a point in alinement with the center of gravity of the cradles; in combination with a reciprocating mechanism for said cradles having engagement with the cradles when seated in operative position and arranged to be disengaged therefrom by the withdrawal of the tray from its seat.

3. In an incubator, in combination with an incubator drawer, an egg-tray composed of a plurality of cradles; a reciprocating connecting bar for said cradles; a reciprocating mechanism for said cradles mounted in said incubator, having sliding engagement with one of said cradles and arranged to be disengaged therefrom by the withdrawal of the tray from its seat.

4. An egg tray consisting of a plurality of cradles, each cradle having a perforate bottom; two end plates and bulging parallel sides, said end plates and sides being contoured for the reception of two rows of eggs arranged in pairs; a longitudinal parting strip fixed in said cradles and arranged to separate said rows of eggs; in combination with a reciprocating mechanism for said cradles arranged to engage with said cradles when the tray is seated and to be disengaged from said cradles by the withdrawal of the tray from its seat.

In testimony whereof I have hereunto affixed my signature.

JAMES L. NIX.